United States Patent Office 3,285,900
Patented Nov. 15, 1966

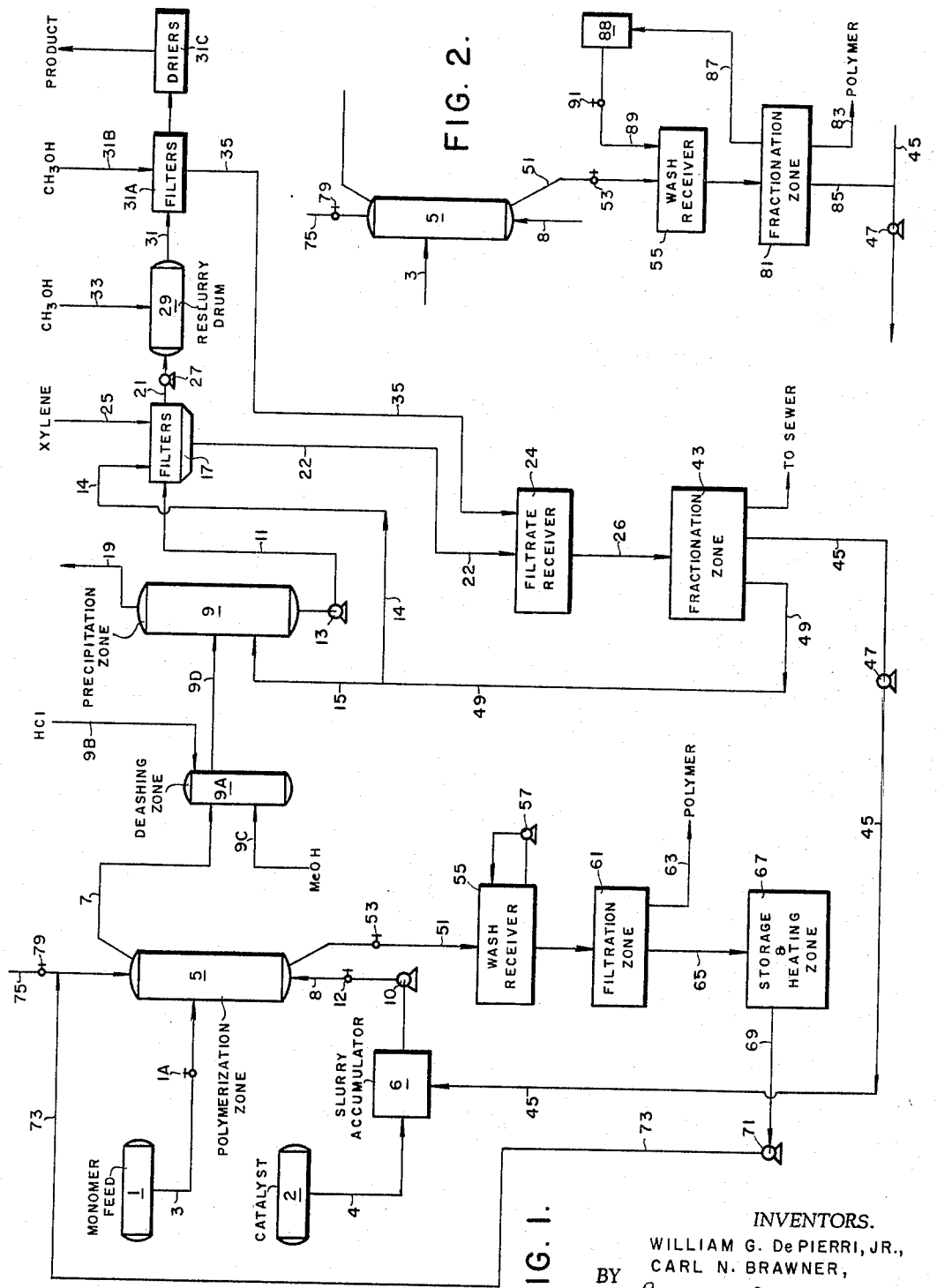

3,285,900
PRODUCTION OF α-OLEFIN POLYMERS
William G. De Pierri, Jr., and Carl N. Brawner, Baytown, Tex., assignors, by mesne assignments, to Esso Research and Engineering Company, Elizabeth, N.J., a corporation of Delaware
Filed Mar. 21, 1963, Ser. No. 267,008
8 Claims. (Cl. 260—93.7)

The present invention is broadly directed to the polymerization of α-olefins, and more particularly to the disposal of a layer of polymer that tends to build up on the walls of a reactor vessel during polymerization.

Processes for the polymerization of α-olefins in the presence of diluent and polymerization catalyst are known in the art. See, for example, Belgian Patent 538,782 and U.S. Patent No. 2,845,414. α-olefins that may be polymerized include $C_2$ to $C_{20}$ α-olefins such as ethylene, propylene, butene-1, pentene-1, hexene, heptene, butadiene, piperlylene, isoprene, dodecene, etc., and mixtures of two or more such α-olefins.

The polymerization catalyst is generally obtained by partial reduction of a halide of a reducible transition metal of group IV–B to VI–B or VIII of the periodic table.

A partial reduction may be accomplished through the use of a chemical reducing agent such as a compound of a group I to group III metal or through the use of ionizing radiation, both of which methods are disclosed in U.S. Patent No. 2,845,414. Examples of suitable halides from which the catalysts of the present invention may be derived are the halides of titanium, zirconium, hafnium, thorium, uranium, vanadium, columbium, tantalum, chromium, molybdenum, tungsten, and mixtures thereof. Examples of suitable compounds include titanium tetrachloride, titanium tetrabromide, zirconium tetrachloride, and the like.

In preparing the polymerization medium by radiation means, for example, the amphoteric metal halide, in solution in the diluent, may be at least partially reduced by exposure to radiation. The radiation should be of an intensity sufficient to generate ion pairs in the metal halide. Various forms of ionizing radiation may be used including, for example, high energy electrons, beta rays, gamma rays, Bremsstrahlung, X-rays, alpha particles, tritons, deuterons, protons, neutrons, the various mesons and hyperons and also recoil fragments of nuclear fission, fusion and spoilation reactions. In many instances it is desirable that the radiation have an intensity sufficient to provide an energy input of from about 0.5 to about 5000 watt-hours of radiation per kilogram of solution during a period of about 0.1 to about 10 hours. It is frequently preferable to provide an energy input of from about 5 to 500 watt-hours of radiation per kilogram of solution. In this situation, the diluent should be a normal $C_5$ to $C_{10}$ paraffin and, preferably, should be n-heptane.

The reduction may also be accomplished chemically by reacting the heavy metal compound with a reducing metal-containing material in the presence of a diluent of the type described above. Among the reducing materials that may be used are the alkali and alkaline earth metals, their alloys, their hydrides and their alkyl and/or aryl compounds such as, for example, mixtures of sodium hydride with boron, magnesium aluminum alloys, lithium butyl, sodium aluminum tetramethyl, etc.

Aluminum compounds of outstanding utility include aluminum alkyls, such as triethyl aluminum, tripropyl aluminum, tri-isopropyl aluminum, tri-isobutyl aluminum, diethyl aluminum halides, di-isobutyl aluminum halides, di-aryl aluminum halides, dimethyl aluminum halides, trimethyl aluminum, and the like. Mixtures of alkyl aluminum compounds can also be used to reduce heavy metal compounds. For example, mixtures containing ethyl aluminum dichloride and diethyl aluminum chloride or bromide have been successfully used to produce active catalysts in this manner. Similarly, mixtures of ethyl aluminum dichloride and triethyl aluminum or of diethyl aluminum chloride and triethyl aluminum can be used. All these compounds, as well as methods for their preparation, are well known in the art. Quite generally, in addition to trialkyl or aryl aluminum compounds, organo-aluminum compounds carrying two hydrocarbon radicals or at least one hydrocarbon radical and one hydrogen, as well as an electron attracting group, such as an alkoxy, halogen, organic nitrogen or sulfur radical, etc., may be used.

Among the more active types of catalyst that may be prepared are the reaction products of trialkyl aluminum or dialkyl aluminum halides with a titanium tetrahalide. More specifically, excellent results have been obtained when using combinations of triethyl aluminum or diethyl aluminum chloride with titanium tetrachloride. These catalysts have been found to afford high yields of good quality, high molecular weight, solid high softening point polymers of ethylene and other olefins even at pressures as low as, or closely approaching, atmospheric pressure.

Representative inert diluents include aliphatic hydrocarbons, aromatic hydrocarbons, chlorinated hydrocarbons, etc., including paraffins and naphthenes such as hexanes, heptanes, octanes, nonanes, decanes, etc., cyclohexanes, mono and poly alkyl cyclohexanes, etc. and mixtures thereof; aromatic hydrocarbons such as benzene, toluene, xylenes, etc. and mixtures thereof, chlorinated hydrocarbons such as chlorobenzene, dichlorobenzene, etc., and mixtures thereof. Preferred diluents include n-heptane and chlorobenzene.

The diluent should be substantially completely free from compounds, including water and oxygen, which have substantial reactivity toward the catalyst constituents. When necessary, the solvent may be purified prior the use by any suitable means such as, for example, by refluxing the solvent over metallic sodium or a similar agent and subsequently distilling the same in an inert atmosphere such as nitrogen whereby any compounds having substantial polarity which may have been initially present in the solvent are removed.

The polymerization is conveniently effected at temperatures of about 0° to 100° C. and pressures ranging from about 0 to 500 p.s.i.g., usually 0 to 100 p.i.s.g. The catalyst concentration in the polymerization zone is preferably in the range of about 0.01 to 0.5 wt. percent based on total liquid and the polymer product concentration in the polymerization zone is preferably kept between about 5 to 25 wt. percent based on total contents so as to allow easy handling of the polymerized mixture. The proper polymer concentration can be obtained by having enough of the inert diluent present or by stopping the polymerization short of 100% conversion of the monomers.

When the desired degree of polymerization has been reached, a portion of the resultant slurry may be withdrawn from the polymerization zone and treated with a $C_1$ to $C_8$ alkanol such as methyl alcohol, isopropyl alcohol or n-butyl alcohol. Desirably, the alkanol is used in combination with a chelating agent such as acetylacetone, or with hydrochloric acid, for polymer deashing. The chelating agent or the hydrochloric acid is added for the purpose of dissolving and deactivating the catalyst and for facilitating precipitating the polymer product from solution. After filtration, the solid polymer may be further washed with water, alcohol or acid such as hydrochloric acid, dried, compacted and packaged.

The polymers produced have molecular weights in the range of about 50,000 to 300,000 or even as high as 3 million as determined by the intrinsic viscosity method using the I. Harris Correlation (J. Polymer Science, 8,361, 1952). The polymers can have a high degree of crystallinity and a low solubility in n-heptane.

In addition to polymerized α-olefin, the slurry withdrawn from the polymerization zone and treated with a $C_1$ to $C_8$ alkanol contains certain catalyst residues such as aluminum tetrachloride, titanium tetrachloride, titanium trichloride, aluminum and titanium oxides and hydroxides, aluminum and titanium chlorides.

The catalyst residues are separated from the solid polymer product along with liquid diluent, alkanol solution, and soluble waxy polymer (in the case of polypropylene) to form a liquid filtrate. The liquid filtrate is then heated, vaporized, and fractionated to separate and recover diluent and alkanol. The diluent and alkanol are recycled into the polymerizing system. The overhead products from the fractionating step include unreacted α-olefin and the corresponding paraffin. Manifestly, it is desirable to use the latter products as liquefied petroleum gas, if such is possible.

The polymerization is conveniently effected in a reactor vessel into which the α-olefin and catalyst are introduced and wherein the pressure and temperature are regulated for optimum polymerization of the α-olefin. It has been found that over a period of time a layer of polymer tends to build up on the walls of the reactor vessel that interferes with the polymerization process. Therefore, from time to time it becomes necessary to shut down the plant so as to stop the polymerization process and to remove the layer of polymer. This it most conveniently brought about by introducing into the reactor vessel a solvent for the polymer at a temperature sufficient to dissolve the polymer. In the past, xylene has been the most commonly used solvent for the polymer. However, when concentrations of poylmer in xylene and similar solvents exceed between 1 and 2 percent, the xylene and dissolved polymer react to produce a tough gel that is almost completely unmanageable. Manifestly, disposal of a tough gel is very difficult, particularly in the quantities that are produced from a polymer production plant of reasonable size. While it is possible to seperate the polymer and the solvent in a fractionation zone, often this is not conveniently possible. Furthermore, when the solvent is transported over lines of any appreciable length, the solvent and polymer are cooled sufficiently to produce the gel and plug the line.

It has now been found that the tough gel produced by techniques known to the prior art can be eliminated by contacting the polymer with a solvent comprising a major amount (greater than 50 percent) of a saturated cyclic hydrocarbon having between 8 and 14 carbon atoms in the molecule thereof and having boiling points in the range of 130° C. to 275° C. at atmospheric pressure. Most conveniently, this is effected by using the cyclic saturated hydrocarbon as the solvent, although satisfactory results have been obtained by introducing the cyclic saturated hydrocarbon into wash liquid comprising polymer and a prior art solvent such as xylene.

Objects and features of the invention not apparent from the above discussion will become evident upon consideration of the following detailed description taken in connection with the accompanying drawing, wherein the single figure is a schematic illustration of an α-olefin polymerization system utilizing the invention.

In the drawing there is shown a polymerization zone generally designated by the reference numeral 5. The polymerization zone contains a suitable agitator and reactor which may be of the type illustrated in U.S. patent application Serial No. 835,069 of Irving Leibson et al., filed August 20, 1959. The polymerization zone is charged from a monomer feed reservoir 1 through charge line 3 controlled by valve 1A. The monomer feed reservoir contains α-olefins such as are recited above, which may be in gaseous or liquid form. It is to be understood that compounds which may have a deleterious effect on polymerization are completely removed from the feed material by apparatus not shown.

In the polymerization zone is a suitable polymerization catalyst, commonly referred to as a Ziegler type catalyst, of the type recited above. Catalyst for the polymerization zone 5 is formed in a catalyst-forming zone 2 in accordance with techniques known to the art. The catalyst-forming zone 2 is connected to polymerization zone 5 through line 4, a catalyst slurry accumulator 6, and line 8 containing a pump 10.

Polymerization of the olefin monomer occurs in zone 5 whereby a slurry of polymerized olefin in catalyst-containing diluent is formed. Preferably, the slurry contains from 5 to 25 percent of polymer. Reacted slurry from the polymerization zone 5 is withdrawn through line 7 and is charged to a de-ashing zone 9A. HCl also is charged to de-ashing zone 9A through line 9B for the purpose of controlling de-ashing of the polymer (removal of residual catalyst). Alkanol, preferably methanol, is added to de-ashing zone 9A through line 9C to kill the polymerization reaction by deactivating the remaining active catalyst in the slurry. The slurry is withdrawn from de-ashing zone 9A and is charged to precipitating zone 9 through line 9D. Also charged to precipitating zone 9 through a line 15 is a $C_1$ to $C_8$ alkanol, preferably methanol, for the purpose of removing waxy or atactic polymer in the slurry. In the precipitating zone 9, at least a major part of the liquid and solid products are removed through line 11 containing a pump 13 and are charged to filter zone 17. The gaseous product from the precipitator is removed through line 19 and may be used in the polymer drying zone.

The liquid-solid mixture charged to the filtering zone 17 through line 11 is separated, for example, by pan, rotary, or centrifugal filters into a substantially solid polymer-containing fraction and a diluent fraction. Diluent, preferably a xylene-alkanol mixture, is injected into the filtering zone through line 25. The filtrate fraction from filtering zone 17 is withdrawn through line 22 into a filtrate receiver 24. The polymer-containing fraction from the filtering zone 17 is removed through line 21 containing pump 27 and charged to suitable reslurry drums where additional alkanol wash liquid is added through line 33. The slurry in drum 29 is withdrawn through line 31 and charged to filtering zone 31A. Alkanol wash liquid is added through line 31B, and the filtrate from zone 31A is charged to filtrate receiver 24 through line 35 where it is combined with filtrate from filter 17. The solid product from filter zone 31A is dried in dryers 31C and is passed therefrom to finishing zones (not shown).

Filtrate is pumped from filtrate receiver 24 into a fractionating zone 43 through line 26. In the fractionating zone 43 the xylene and alkanol constituents are separated from each other and from the normally gaseous constituents of the filtrate. The xylene fraction is removed through line 45 containing a pump 47 and is charged to catalyst accumulator 6 to suitably dilute the catalyst therein. The $C_1$ to $C_8$ alkanol constituents, such as methanol, are removed through line 49 and are charged therefrom to precipitator 9 through line 15, and to filtering zone 17 through line 14 along with the xylene or methanol injected through line 25.

After the system described above has been in operation for a period of time, it will be noted that the efficiency of the reactor vessel will decrease as the result of build-up of a layer of polymer on the sides of the reactor vessel 5. At this time the plant may be shut down and valves 1A and 12 controlling lines 3 and 8, respectively, are closed. Valves 79 and 53 controlling lines 75 and 51, respectively, are opened. Line 75 connects the upper end of the reactor vessel to a source of solvent for the polymer. As mentioned above, this solvent contains a major amount of a cyclic saturated hydrocarbon having between 8 and 14 carbon atoms in the molecule thereof and having boiling points between 130° to 275° C. atmospheric pressure. The solvent may contain other constituents such as aromatic hydrocarbons, but preferably, the ratio of saturated cyclic hydrocarbons to aromatic hydrocarbons should not be less than 1:1. An excellent solvent for use in accordance with the present invention is known in the art as arctic diesel fuel oil, which is a heavy kerosene distilled from Coastal crude oil. Arctic diesel fuel oil contains substantially 60 percent of saturated cyclic hydrocarbons, as described above, and substantially 20 percent of aromatics. The olefin content is approximately 4 percent. The initial boiling point is approximately 297° F., and the final boiling point is approximately 533° F. Another satisfactory solvent is known in the art as gas oil and may be characterized as containing about 80 vol. percent mixed sweet and 20 vol. percent Coastal heavy kerosene. Typical analyses of these solvents by mass spectrometer and fluorescence indicating absorption are shown in the following table:

|  | Vol. Percent | |
| --- | --- | --- |
|  | Gas Oil | Arctic Diesel |
| Aromatics | 22.9 | 21.7 |
| Olefins | 2.4 | 1.7 |
| Paraffins | 37.2 | 8.4 |
| Naphthenes | 18.0 | 24.6 |
| Condensed Naphthenes | 19.5 | 43.6 |
| Total | 100.0 | 100.0 |

Other solvents may be used within the limits set forth above.

The solvent may be injected into the reactor vessel 5 as a spray at a temperature of at least 130° C., and preferably about 170° C., and is withdrawn from the reactor through line 51 at or near the lower end of the reactor vessel. The wash liquid is conducted to a wash receiver 55 having in connection therewith apparatus for circulating the liquid therein. This apparatus may consist of a pump 57 having its suction end connected to a lower portion of the wash receiver and its exhaust end connected near the upper end of the wash receiver. The reason for circulating the wash liquid in the wash receiver is to promote cooling thereof so that polymer will precipitate from the wash liquid as rapidly as possible. The wash receiver may be an open tank and may have in connection therewith a cooling jacket for conducting heat away therefrom as quickly as possible.

When the wash liquid is sufficiently cooled, it is passed into a filtration zone 61 wherein precipitated polymer is separated from the solvent. When the wash liquid is below a temperature of approximately 50° C., it will be found that substantially all of the polymer is precipitated from the wash liquid. From the filtration zone the polymer is withdrawn via line 63 and may be washed and dried to produce a relatively low grade marketable product. The solvent is withdrawn through line 65 into a storage and heating zone 67 where it may be stored until the next shutdown of the plant for removal of polymer from the reactor vessel, and wherein it is heated to a suitable temperature for polymer removal. The heated solvent is pumped to line 75 by means of pump 71 through lines 69 and 73.

When it is desired to use xylene as the polymer solvent, the embodiment of the invention shown in FIG. 2 may be used. Xylene solvent is injected through line 75 into the top of the reactor vessel, and the solvent and polymer in solution therein is withdrawn through line 51 into wash receiver 55. Before the solvent and polymer has had an opportunity to cool appreciably, an amount of gelation inhibitor comprising a saturated cyclic hydrocarbon as described above is injected into the wash receiver 55 through line 89 controlled by valve 91. The gelation inhibitor is preferably arctic diesel. The amount of gelation inhibitor introduced into the wash receiver should be in the ratio of saturated cyclic hydrocarbons to xylene solvent of about 1:4. The wash liquid is immediately passed to a fractionating zone 81 whereat the constituents of the mixture are separated. The polymer is withdrawn from the fractionating zone through line 83, the gelation inhibitor is withdrawn through line 87 and is stored in vessel 88. The xylene is withdrawn through line 85 and injected into line 45 for use in the process when the system is again started for the manufacture of polymers.

It has been found that by using arctic diesel fuel oil as the wash liquid, polymer can be dissolved in the solvent to an amount greater than 10 percent by weight. When gas oil is used as the solvent, polymer may be dissolved therein up to about 9 or 10 percent by weight without danger of gelation. The reason for the lack of gelation when polymer is contacted by cyclic hydrocarbon, as described above, is not understood. It is believed that the gel results as the result of entrapment of solvent by the polymer chains which are, in effect, cross-linked by the formation of crystalline regions. These crystalline regions cause the mass to act in much the same manner as cross-linked rubber when it is swollen with solvent. However, to date, no satisfactory explanation has been proposed for the lack of gelation resulting from the present invention.

The objects and features of the invention having been completely described, what we wish to claim is:

1. In the process for polymerizing an $\alpha$-mono-olefinic feed material in a polymerizing reactor vessel in the presence of a stereospecific polymerizing catalyst and a diluent to form a slurry including catalyst residues, polymerized olefins, unpolymerized olefins and a diluent that is removed from the reactor vessel for separation of the constituents thereof and wherein a layer of polymer tends to accumulate on the walls of the reactor vessel, the improved method of recovering the polymer in the layer comprising: contacting the polymer with a liquid hydrocarbon solvent for said polymer, the solvent being introduced at a temperature of at least 130° C. and comprising a major amount of $C_8$ to $C_{14}$ cyclic saturated hydrocarbons having boiling points in the range 130° C. to 275° C. at atmospheric pressure, cooling the polymer and solvent to form a slurry, and separating said polymer from said solvent.

2. The method of claim 1 wherein said hydrocarbon solvent further includes aromatic hydrocarbons and the ratio of $C_8$ to $C_{14}$ cyclic saturated hydrocarbons to aromatic hydrocarbons is not less than 1:1.

3. In the process for polymerizing an $\alpha$-mono-olefinic feed material in a polymerizing reactor vessel in the presence of a stereospecific polymerizing catalyst and a diluent to form a slurry including catalyst residues, polymerized olefins, unpolymerized olefins and a diluent that is removed from the reactor vessel for separation of the constituents thereof and wherein a layer of polymer tends to accumulate on the walls of the reactor vessel, the improved method of recovering the polymer in the layer comprising: washing the walls of the reactor vessel with a liquid hydrocarbon solvent for said polymer, the solvent being introduced at a temperature of at least 130° C. and comprising a major amount of $C_8$ to $C_{14}$ cyclic saturated hydrocarbons having boiling points in the range 130° C. to 275° C. at atmospheric pressures, cooling the polymer and solvent to form a slurry, and separating said polymer from said solvent.

4. In the process for polymerizing an $\alpha$-mono-olefinic feed material in a polymerizing reactor vessel in the presence of a stereospecific polymerizing catalyst and a diluent to form a slurry including catalyst residues, polymerized olefins, unpolymerized olefins and a diluent that is removed from the reactor vessel for separation of the constituents thereof and wherein a layer of polymer tends to accumulate on the walls of the reactor vessel, the improved method of recovering the polymer in the layer comprising: washing the walls of the reactor vessel with arctic diesel fuel oil wherein the ratio of $C_8$ to $C_{14}$ cyclic saturated hydrocarbons to aromatic hydrocarbons is not less than 1:1, at a temperature of at least 130° C. until the polymer layer is substantially completely dissolved, agitating and cooling the resultant wash liquid until a mobile slurry of polymer and arctic diesel fuel oil is formed, and filtering the polymer from the arctic diesel fuel oil.

5. In the process for polymerizing an $\alpha$-mono-olefinic feed material in a polymerizing reactor vessel in the presence of a stereospecific polymerizing catalyst and a diluent to form a slurry including catalyst residues, polymerized olefins, unpolymerized olefins and a diluent that is removed from the reactor vessel for separation of the constituents thereof and wherein a layer of polymer tends to accumulate on the walls of the reactor vessel, the improved method of recovering the polymer in the layer comprising: washing the walls of the reactor vessel with xylene at a temperature of at least 130° C. until the layer is removed, admixing with the resultant wash liquid a quantity of a liquid hydrocarbon solvent for the polymer, the solvent being introduced at a temperature of at least 130° C. and comprising a major amount of $C_8$ to $C_{14}$ cyclic saturated hydrocarbons having boiling points within the range of 130° C. to 275° C. at atmospheric pressure, agitating and cooling the resultant wash liquid until a mobile slurry of polymer and wash liquid is formed, and distilling the resultant mixture in a fractionating zone to separate the constituents thereof.

6. The method of claim 5 wherein the liquid hydrocarbon is arctic diesel fuel oil.

7. The method of claim 5 wherein the liquid hydrocarbon is gas oil.

8. The method of claim 5 wherein said hydrocarbon solvent further includes aromatic hydrocarbons and the ratio of $C_8$ to $C_{14}$ saturated cyclic hydrocarbons to aromatic hydrocarbons is not less than 1:1.

References Cited by the Examiner
UNITED STATES PATENTS

| | | | |
|---|---|---|---|
| 2,801,234 | 7/1957 | Hanson | 260—94.9 |
| 2,921,933 | 1/1960 | McKinnis et al. | 260—94.9 |
| 2,989,516 | 6/1961 | Schneider | 260—94.9 |
| 3,139,415 | 6/1964 | Speed et al. | 260—94.9 |
| 3,145,537 | 8/1964 | Hagemeyer et al. | 260—94.9 |

JOSEPH L. SCHOFER, *Primary Examiner.*

WILLIAM H. SHORT, *Examiner.*

E. M. OLSTEIN, L. EDELMAN, *Assistant Examiners.*